United States Patent
Kitamura

(10) Patent No.: US 6,275,216 B1
(45) Date of Patent: Aug. 14, 2001

(54) KEYBOARD FOR INPUTTING CHARACTER AND ELECTRONIC APPARATUS USING THE SAME

(75) Inventor: Takuo Kitamura, Nissin (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/218,100

(22) Filed: Dec. 22, 1998

(51) Int. Cl.$^7$ ........................................ G09G 5/00
(52) U.S. Cl. .................. 345/171; 345/168; 341/28; 708/146
(58) Field of Search ...................... 345/171, 168; 341/28; 707/534, 535, 536; 708/146

(56) References Cited

U.S. PATENT DOCUMENTS

| | | | | |
|---|---|---|---|---|
| 4,737,040 | * | 4/1988 | Moon | 400/110 |
| 4,872,196 | * | 10/1989 | Royer et al. | 455/564 |
| 5,486,823 | * | 1/1996 | Tsai | 341/22 |
| 5,936,556 | * | 8/1999 | Sakita | 341/28 |

FOREIGN PATENT DOCUMENTS

| | | | |
|---|---|---|---|
| 60-169923 | 9/1985 | (JP) | G06F/3/02 |
| 2-86257 | 3/1990 | (JP) . | |
| 6-28085 | 2/1994 | (JP) . | |
| 6-43997 | 2/1994 | (JP) . | |
| 6-214699 | 8/1994 | (JP) | G06F/3/23 |
| 8-328732 | 12/1996 | (JP) . | |

* cited by examiner

*Primary Examiner*—Richard Hjerpe
*Assistant Examiner*—Alexander Eisen
(74) *Attorney, Agent, or Firm*—Sughrue, Mion, Zinn, Macpeak & Seas, PLLC

(57) ABSTRACT

A plurality of keyboards are provided which are capable of inputting Japanese phonetic characters by letters and numerals and letters in English.

In the Japanese phonetic character inputting mode, the numeric keys including "0" key 31 and "6" to "9" keys 26 to 29 are assigned as separator keys, the numeral keys including "1" to "5" keys 26 to 29 are assigned as code keys. In the English inputting mode, two symbol keys including "*" key 30 and "#" key 31 are assigned as code keys and the remaining keys are assigned as separator keys.

Ten characters including M, Y, R, W, P, F, J, L, Q are input by sequential strokes of data keys following to a stroke of the "*" key, and letters G, Z, D, N, B, X, SPACE, <, >, <., >., and V are input by sequential strokes of data keys following to the strokes of the "#" key. In addition, the Japanese phonetic character inputting mode and the letter inputting mode in English can be switched by sequential strokes of "*" and "#", or "#" and "*" keys.

11 Claims, 7 Drawing Sheets

| 10-KEY-BOARD | 0 | 1 | 2 | 3 | 4 | 5 | 6 | 7 | 8 | 9 | / | * | + | = | - | C L R | H L P |
|---|---|---|---|---|---|---|---|---|---|---|---|---|---|---|---|---|---|
| JAPANESE | P | Y | R | W | M | H | N | K | S | T | A | I | U | E | O | | |
| | | | | | | B | NN | G | Z | D | | | | | | | |
| EUROPEAN LANGUAGE | P | Y | R | W | M | H | N | K | S | T | A | I | U | E | O | | |
| | | | V | | X | B | | G | Z | D | F | J | L | Q | C | | |

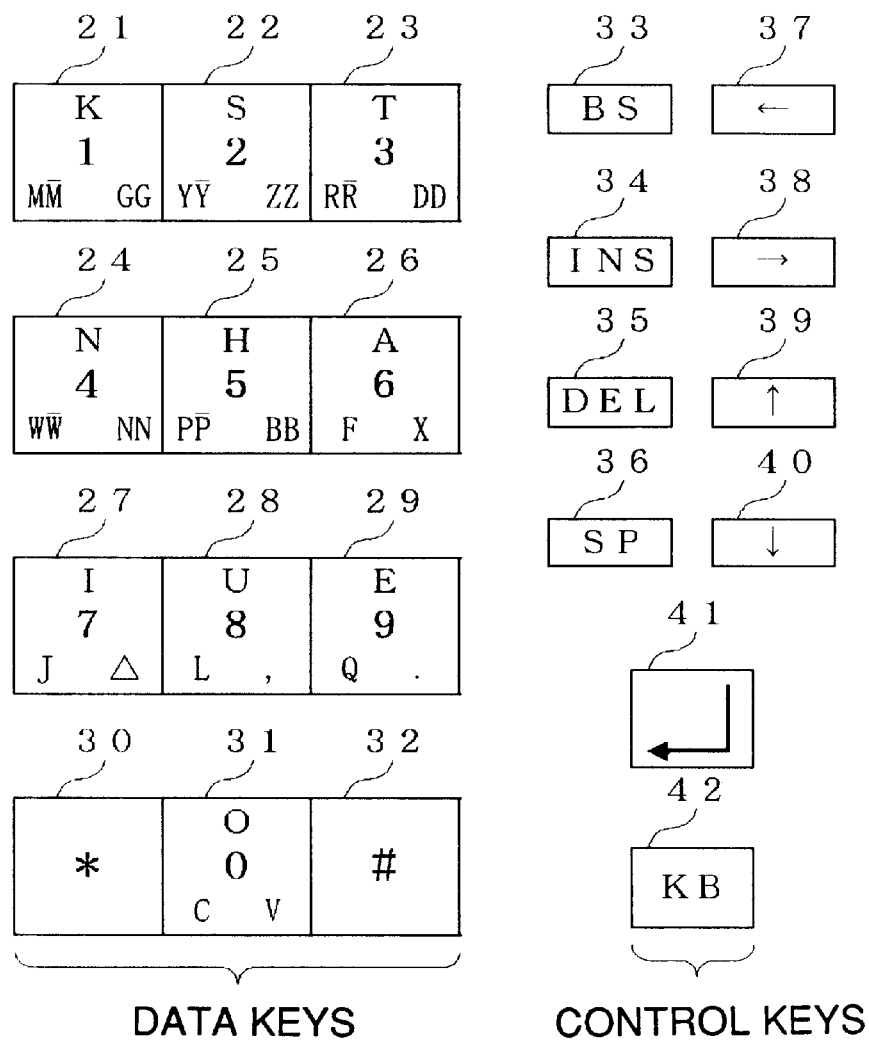
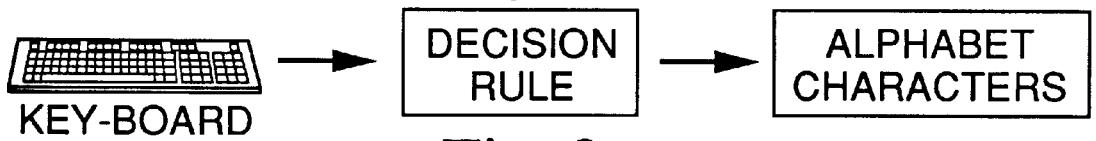

| A | I | U | E | O |
|---|---|---|---|---|

| K   | S   | T   | N   | H   |
|-----|-----|-----|-----|-----|
| MM GG | YY ZZ | RR DD | WW NN | PP BB |

Fig. 6

| A | I | U | E | O |
|---|---|---|---|---|

| K  | S  | T  | N  | H  |
|----|----|----|----|----|
| GG | ZZ | DD | NN | BB |
| M  | Y  | R  | W  | P  |

Fig. 7

| A F | I J | U L | E Q | O C |
|-----|-----|-----|-----|-----|
| K G | S Z | T D | N NN | H B |
| M V | Y X | R   | W   | P   |

| C1 |
|----|

Fig. 8

| A<br>M  F | I<br>Y  J | U<br>R  L | E<br>W  Q | O<br>P  C | C 1 |
|---|---|---|---|---|---|
| K<br>G  V | S<br>Z  X | T<br>D    | N<br>NN   | H<br>B    | C 2 |

Fig. 9

| A<br>F  X | I<br>J  △ | U<br>L  , | E<br>Q  . | O<br>C  V | C 1 |
|---|---|---|---|---|---|
| K<br>M  G | S<br>Y  Z | T<br>R  D | N<br>W NN | H<br>P  B | C 2 |

Fig. 10

| E | U | I | A | O |
|---|---|---|---|---|

| e<br>Q | u<br>L | i<br>J | a<br>F | o<br>C |
|---|---|---|---|---|

| MD | C S | S P | NM | X |
|---|---|---|---|---|

| K | S | T | N | H |
|---|---|---|---|---|

| M | Y | R | W | P |
|---|---|---|---|---|

| G | Z | D | V | B |
|---|---|---|---|---|

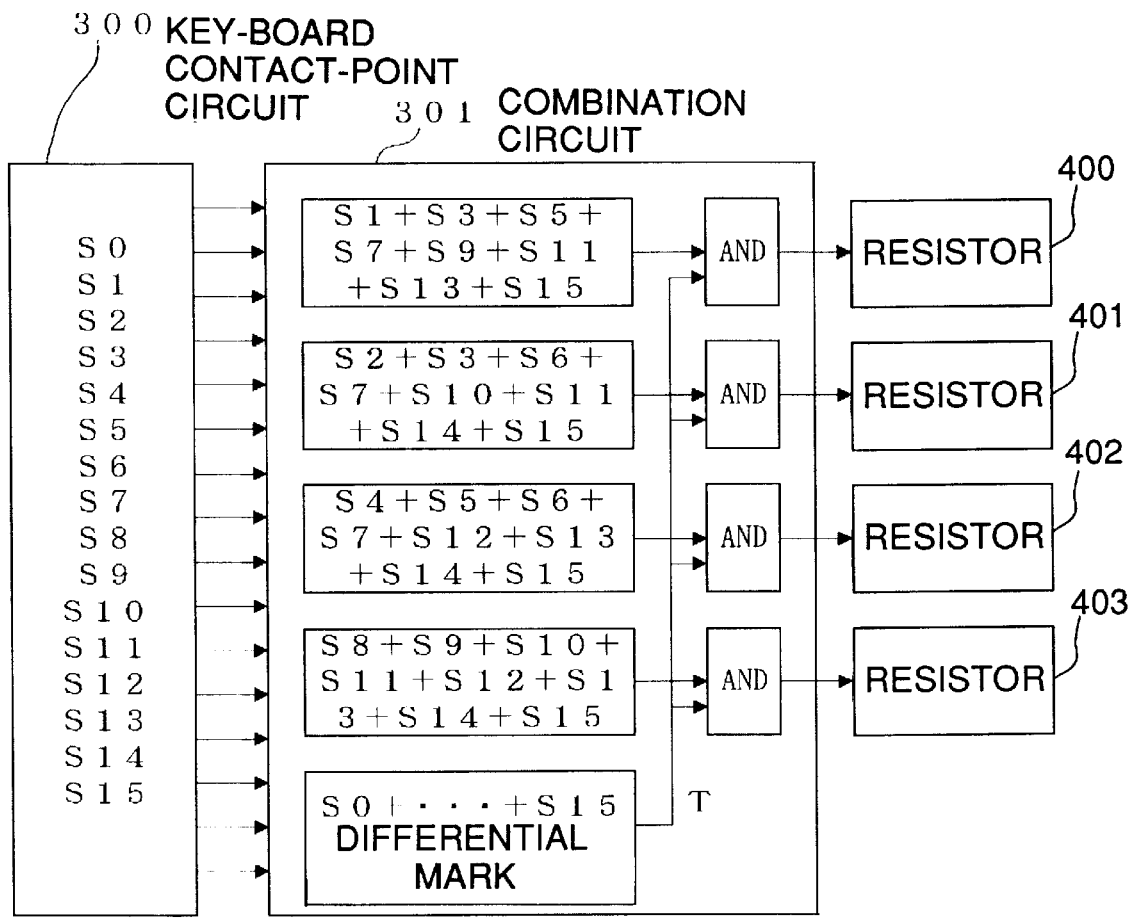

| 10-KEY-BOARD | 0 | 1 | 2 | 3 | 4 | 5 | 6 | 7 | 8 | 9 | / | * | + | = | - | CLR | HLP |
|---|---|---|---|---|---|---|---|---|---|---|---|---|---|---|---|---|---|
| JAPANESE | P | Y | R | W | M | H | N | K | S | T | A | I | U | E | O | | |
| | | | | | | B | NN | G | Z | D | | | | | | | |
| EUROPEAN LANGUAGE | P | Y | R | W | M | H | N | K | S | T | A | I | U | E | O | | |
| | | | V | | X | B | | G | Z | D | F | J | L | Q | C | | |

| K | S | T | N | H |
|---|---|---|---|---|
| M | Y | R | W | P |
| A | I | U | E | O |

| SPACE | * | # | CR |
|---|---|---|---|

| E | U | I | A | O |
|---|---|---|---|---|
| e Q | u L | i J | a F | o C |
| MD | CS | SP | NM | X |

| K | S | T | N | H |
|---|---|---|---|---|
| M | Y | R | W | P |
| G | Z | D | V | B |

Fig. 17

| KA-ROW | SA-ROW | TA-ROW | NA-ROW | HA-ROW |
|---|---|---|---|---|
| 11 | 9 | 10 | 8 | 4 |
| MA-ROW | YA-ROW | RA-ROW | WA-ROW | PA-ROW |
| 11 | 9 | 10 | 8 | 4 |
| GA-ROW | ZA-ROW | DA-ROW | | BA-ROW |
| 11 | 9 | 10 | | 4 |

KEYBOARD FOR INPUTTING CHARACTER AND ELECTRONIC APPARATUS USING THE SAME

BACKGROUND OF THE INVENTION

1. Field of the Invention

This invention relates to various keyboards for inputting characters and an electronic apparatuses using these keyboards, and particularly relates to keyboards using separator keys and code keys and digital electronic apparatuses using these keyboard system.

This application is based on Patent Application No. Hei 9-168223 filed in Japan, the contents of which are incorporated herein by reference.

2. Background Art

Conventionally, in a digital electronic apparatus, inputting of character information is generally executed by a keyboard. As a representative keyboard, there is the so-called QWERTY keyboard. Since the QWERTY keyboard possesses a large number of keys, it is desired to provide a keyboard which is capable of coping with the requirements of easy operation and reduction to a small size, for a portable electronic apparatus with a reduced size. This is because conventional keyboards in general, including the QWERTY keyboard, have too many keys including keys unnecessary for inputting Japanese characters.

A measure to cope with the above conventional problems was proposed in Japanese Patent Application, First Publication No. 7-244548. This technique relates to a keyboard in which some keys are arranged, differently from the QWERTY-type arrangement, into an oblique arrangement in which the keys become further from the operator toward the right side, and some keys such as "Q" key have different locations because the "Q" key locations is not so frequently used, and the "shift key" is disposed at an appropriate position suitable for portable apparatuses.

Furthermore, Japanese Patent Application, First Publication No. Hei 6-102979 discloses a "keyboard operable by one hand".

This "one hand keyboard" operable by one hand will be described hereinafter with reference to FIG. 18, which illustrates the disposition of keys in the one hand keyboard, but first, a brief description will be given about the Japanese language, to facilitate understanding of Japanese character input.

The Japanese language is written literally as a mixture of "kana" characters, which are phonetic characters representing syllables, and "kanji" characters, which are Chinese characters or ideograms. The kana characters can be input by a keyboard, usually by entering a combination of roman letters corresponding to the pronunciation of the kana. For kana, whose pronunciation consists of a consonants plus vowel sound, first by inputting a consonant and then a vowel by roman letters, and then converting the two roman letters into a kana letter. Hereinafter, kana characters will be called kana characters or Japanese phonetic characters, and roman letters will be roman letters or simply letters. A more detailed explanation of the kana characters will be given later this application.

In contrast, since kanji characters are ideograms, kanji characters are input by a keyboard by inputting several kana by letters, and then the kanji characters are input by electronic conversion of these kana. Hereinafter, the kanji characters are called kanji characters or ideograms.

Referring to FIG. 18, the one hand keyboard 101 is composed of fifteen main keys 102, five control keys 103, ten function keys 104, four cursor keys 105, one kana mode key 106, one symbol mode key 107, one numeral mode key 108, and a shift key 109. In addition, the kana-mode key 106, the symbol mode key 107, and the numeral mode key 108 are indicated by respective lights, when they are active.

In turn, the main keys 102 for inputting data are disposed forming a matrix of three rows by five lines. The center row corresponds to five vowel letters. The other two rows correspond to ten consonant letters including unvoiced and semi-voiced letters. The four voiced consonants are input by two sequential strokes of unvoiced consonants. The remaining letters are input by using the shift keys. The voiced consonants may be input by two sequential strokes of the corresponding unvoiced letters. Thereby, input of Japanese phonetic characters by Roman letters and input of the letters of the alphabet may be executed with good operability.

This keyboard is designed so as to realize the same functions as those of the usual data-inputting keyboard by additional disposition of control keys 103, functional keys 104, cursor keys 104, the kana mode key 106, the symbol mode key 107, numeral mode key 108, and the shift key 109 around the matrix of the main keys 102.

Japanese Patent Application, Second Publication No. Hei 6-28085 discloses an improved keyboard. The keyboard is related to a control panel of a portable-type electric transmission apparatus of still images, in which a function key, numeral keys, a "*" key, and a "#" key are provided, and for each numeral key from "1" to "9", letter keys for "Q, Z", "A, B, C", "D, E, F", "G, H, I", "J, K, L", "M, N, O", "P, R, S", "T, U, V", and "W, X, Y" are allocated. Letters are input by first selecting a letter input mode by the function key, selecting a letter by, for example, the number of times of sequential strokes, and capital and lower case letters are input using numeral keys from "1" to "9", which are normally used for numerals. By successive strokes of, for example, the numeral key "2", the following characters are selected "2"→"A"→"B"→"C"→"a"→"b"→"c"→"2". This keyboard is designed so as to input symbol marks by selecting a symbol mark by sequential strokes of the "* key" and the "#" key.

For reference, the relationship between Japanese kana characters (phonetic characters) and their representation by letters is shown in Table 1.

TABLE 1

| Japanese kana characters and their notations by letters. | | | | | | | | | | | | | | |
|---|---|---|---|---|---|---|---|---|---|---|---|---|---|---|
| あ | か | さ | た | な | は | ま | や | ら | わ | が | ざ | ば | ぱ | ん |
| A | ka | sa | ta | na | ha | ma | ya | ra | wa | ga | za | ba | pa | nn |
| い | き | し | ち | に | ひ | み | | り | | ぎ | じ | び | ぴ | |
| I | ki | si | ti | ni | hi | mi | | ri | | gi | zi | bi | pi | |
| う | く | す | つ | ぬ | ふ | む | ゆ | る | | ぐ | ず | ぶ | ぷ | |

TABLE 1-continued

Japanese kana characters and their notations by letters.

| U | ku | su | tu | nu | hu | mu | yu | ru |    | gu | zu | bu | pu |
|---|----|----|----|----|----|----|----|-----|----|----|----|----|----|
| え | け | せ | て | ね | へ | め |    | れ | げ | ゼ | べ | ぺ |  |
| E | ke | se | te | ne | he | me |    | re |    | ge | ze | be | pe |
| お | こ | そ | と | の | ほ | も | よ | ろ |    | ご | ぞ | ぼ | ぽ |
| O | ko | so | to | no | ho | mo | yo | ro |    | go | zo | bo | po |

There is another keyboard which is disclosed in Japanese Patent Application, Second Publication No. Hei 2-86257. This keyboard can input Japanese phonetic characters by sequential strokes of the numeral keys from "1" to "9". The rows of kana are comprised of the "A-row" consisting of five kana corresponding to A, I, U, E, and O as shown in the leftmost column of Table 1; the "ka-row" consisting of the five kana corresponding to ka, ki, ku, ke, and ko, shown in the second column of Table 1; the "sa-row" consisting of the kana for sa, si, su, se, and so, shown in the third left column; the "ta-row" consisting of ta, ti, tsu, te, and to shown in the fourth left column of Table 1; the "na-row" consisting of na, ni, nu, ne, and no, shown in the fifth column of Table 1; the "ha-row" consisting of ha, hi, hu, he, and ho shown in the sixth column of Table 1; the "ma-row" consisting of ma, mi, mu, me, mo shown in the seventh column of Table 1; and the "ya-row" consisting of ya, yu, and yo shown in the eighth column of Table 1, the ra-row consisting of ra, ri, ru, re, ro shown in the ninth column of table 1. Inputting of the kana characters by letters is executed by selecting the input mode by a stroke of a function key, selecting a kana by successive strokes of a corresponding numeral key, and inputting the kana by a stroke of the numeral key. Inputting of letters including capital letters and lower case letters in addition to numerals is also possible by this type of keyboard.

Another keyboard is disclosed in Japanese Patent Application, Second Publication No. Sho 61-188659. This is related to an electronic apparatus provided with a keyboard for inputting kana by letters and a conversion means for converting input letters into phonetic characters. This keyboard is provided with a unified key, which representing all keys except keys for inputting vowels and consonants at the time of inputting phonetic characters by roman letters, and a selecting means for selecting a particular vowel or a particular consonant by a stroke of the unified key.

Another keyboard is disclosed in Japanese Patent Application, First Publication No. Sho 57-159331. This disclosure is related to an electronic apparatus comprising an input means consisting of vowel character keys and consonant character keys; a signal generating means for generating a signal consisting of a judgement bit for judging whether the input letter is a vowel or a consonant letter and a control bit for indicating whether the input bit is the vowel letter or the consonant letter; an identification means for identifying whether the output signal from said signal generating means is a vowel signal or a consonant signal; an identification means for identifying whether the signal is a vowel signal or a consonant signal; and a signal generating means for generating designating a signal whether the letter to be input is composed of merely a vowel signal or merely a consonant signal, or a hybrid signal of the vowel signal and the consonant signal.

The hereinabove described conventional keyboard systems disclosed in Japanese Patent Application, First Publications Nos. Hei 7-244548, Hei 6-102979, and Sho 61-188659, and Japanese Patent Application, Second Application No. Sho 57-159331 have the common drawback that these keyboards are inferior in input operability, due to the small area of their keys.

The reason for this is that the keyboard system disclosed, for example, in Japanese Patent Application, First Publication No. Hei 7-244548 is provided with 28 letter keys and ten numeral keys to be disposed on a keyboard of a portable type information apparatus, and the letter and numeral keys cannot be large enough to ensure the operability in an input operation.

The keyboard system disclosed in Japanese Patent Application, First Publication No. Hei 6-102979 is provided with 38 keys in total including 15 main keys (serving both as the letter and numeral keys), five control keys, ten function keys, four cursor keys, one kana mode key, one symbol mode key, one numeral mode key, and one shift key to be arranged in a keyboard for one hand, and the area of each key is limited.

The keyboard system disclosed in Japanese Patent Application, First Publication No. Sho 61-188659 is provided with 25 keys in total including 15 alphabetical keys, and ten numeral keys, since alphabetical keys and numeral keys are separately provided.

Furthermore, the keyboard system of Japanese Patent Application, First Publication No. 57-159331 is provided with 36 keys in total consisting of 26 alphabetical keys and ten numeral keys, since the alphabetical keys and numeral keys are separately provided.

The second drawback of the conventional keyboards is poor input operability of Japanese characters, as disclosed in Japanese Patent Applications, First Publications Nos. Hei 7-244548, Hei 2-86254, and Sho 57-244548. The reason is, as disclosed in Japanese Patent Application, First Publication No. Hei 7-244548, that the vowel keys and consonant keys are disposed on the keyboard in a mixed manner.

In the conventional keyboard system disclosed in Japanese Patent Application, First Publication No. Hei 6-28085, letters A, I, U, E and O, corresponding to Japanese vowels, and letters K, S, T, N, and H corresponding to Japanese consonants, are allocated to identical keys, in a mixed manner, so that it is necessary to use several key strokes.

The poor operability of the keyboard system disclosed in Japanese Patent Application, First Publication No. Hei 2-26257 is because the appearance frequency of each phonetic character is not taken into consideration. For example, when a character in the "o -line" (that is, o, ko, so, . . . ) is input, it is necessary to use up to six key strokes for each phonetic character, which results in increasing the number of strokes for inputting, and deteriorates the operability of the keyboard.

The poor operability of the conventional keyboard disclosed in Japanese Patent Applications, First Publications No. Sho 57-159331 is due to the mixed disposition of vowel keys and consonant keys.

The third drawback of the conventional keyboard systems which is found, for example, in Japanese Patent Application, First Publication No. Sho 61-188659 is its poor operability in inputting letters. This is because it is necessary to use several key strokes for inputting letters such as, for example, "Z".

It is therefore an object of the present invention to provide a character input system by a keyboard and an electronic apparatus which possesses a reduced number of keys on the keyboard, while facilitating the inputting of Japanese kana phonetic characters by letters (Roman letters) by making use of the characteristics of the Japanese language and facilitating inputting numerals and letters as well.

SUMMARY OF THE INVENTION

According to one aspect of the present invention, the first keyboard of the present invention comprises a separator key which is marked with a separator mark, which is capable of selecting a letter by one stroke of the separator key; a code-key marked with a code mark, which is not able to select a letter by one stroke of a code key, while a letter is input by the combination of a separator mark following a code mark, wherein said keyboard executes inputting of a character by zero, one, or a plurality of strokes of a code key 1111 and a sequential stroke of a separator key for selecting a letter.

According to another aspect, the present invention provides a second keyboard for inputting characters by a keyboard as recited above, wherein, at the time of inputting Japanese phonetic characters using alphabetical letters, vowel keys such as the "A", "I", "U", "E", and "O" keys are designated as separator keys, and a part of or all of the remaining consonant keys starting from the "K" key are designated as code keys.

According to another aspect, the present invention provides a third keyboard for inputting kana as recited above, wherein, among the letter keys corresponding to the consonants of kana, a first key group composed of five phonetic characters which have the highest appearance frequency among the kana are designated as said code keys; a second group of five kana excluding said first five kana are input by a two sequential strokes of keys corresponding to the first group of code keys; and a third group of kana are input by a two sequential strokes of keys excluding said first key group.

According to still another aspect, the present invention provides a fourth keyboard for inputting kana as recited above, wherein, among the letters corresponding to consonants of the kana, a first consonant letter for ten kana with the highest appearance frequency are assigned as code marks, and five consonant letters excluding said ten consonant letters are input by a two sequential strokes of the same code keys.

According to still another aspect, the present invention provides a fifth keyboard as recited above, wherein, at the time of inputting letters in English, a part of the letters are assigned as separator marks and a part of or all of the remaining letters are assigned as code marks.

According to still another aspect, the present invention provides a sixth keyboard according to the first aspect, wherein, at the time of inputting both Japanese kana by letters and letters in English, a part of the letters are used for inputting both kana and letters in English and remaining letters are input by the keys provided for inputting these letters.

According to still another aspect, the present invention provides a seventh keyboard according to the first aspect, wherein, at the time of inputting both Japanese kana characters by letters and letters in English, the allocations of some of the separator marks and some of the code marks are changed for inputting Japanese kana characters and for inputting alphabetical letters in English, and the allocations of the remaining separator marks and code marks are maintained without change.

According to still another aspect, the present invention provides a eighth keyboard according to the first aspect, wherein a mode key is provided for switching from an inputting mode of Japanese phonetic characters corresponding to the Japanese kana inputting mode to an inputting mode of the letters in English corresponding to the English inputting mode.

According to still another aspect, the present invention provides an electronic apparatus to which a keyboard according to the first aspect is applied.

According to still another aspect, the present invention provides a ninth keyboard according to the first aspect, wherein, when inputting Japanese phonetic characters by letters, five of the ten numeral keys, i. e., from "0", "1" to "9", are assigned to be separator keys for inputting the five letters of A, I, U, E, and O, corresponding to vowel syllables, and the remaining five numeral keys are assigned as code keys for inputting the consonants K, S, T, N, and H which have the second highest appearance frequency after vowel syllables, and the remaining consonants are input by sequential strokes of the same code keys or a sequential strokes of different code keys; and when inputting letters in English, "*" and "#" keys are assigned to be said code keys, and ten numeral keys from "0" to "9" are allocated to "A", "I", "U", "E", "O", "K", "S", "T", "N", to "H", which are assigned as separator keys, and consonants of F, J, L, Q, C, M, Y, R, W, and P are input by a sequential strokes of those separator keys following a stroke of said "*" key, and letters X, space, comma, period, V, G, Z, D, N, and B are input by sequential strokes of said separator keys followed by the "#" key.

BRIEF DESCRIPTION OF THE DRAWINGS

FIG. 1 is a diagram explaining the seventh embodiment of the present invention.

FIG. 2 is a block diagram showing an inputting process of character information by a keyboard.

FIG. 3 is a diagram for explaining a code symbol and a separator symbol.

FIG. 4 is a diagram showing characters used for representing Japanese phonetic characters by letters (roman letters).

FIG. 5 is a diagram showing the first embodiment of the present invention.

FIG. 6 is a diagram showing the second embodiment of the present invention.

FIG. 7 is a diagram showing the third embodiment of the present invention.

FIG. 8 is a diagram showing the fourth embodiment of the present invention.

FIG. 9 is a diagram showing the fifth embodiment of the present invention.

FIG. 10 is a diagram showing the sixth embodiment of the present invention.

FIG. 11 is a diagram showing an operation of a hard ware according to the present invention.

FIG. 12 is a diagram showing the eighth embodiment of the present invention.

FIG. 17 is a diagram showing the average frequency of appearance for each character for inputting Japanese text by letters.

DESCRIPTION OF THE PREFERRED EMBODIMENTS

Figures 13, 14, 15, 16:
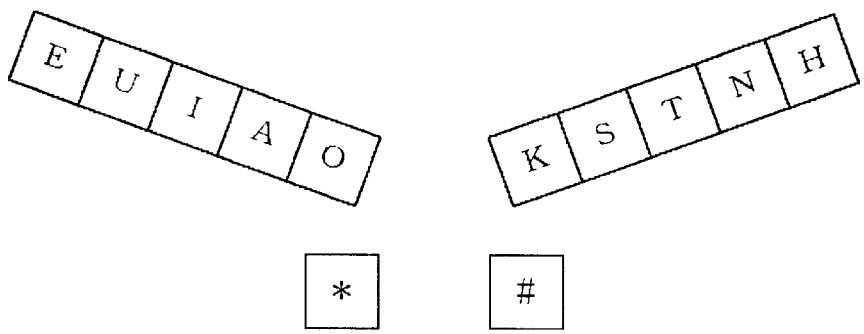
FIG. 13 is a diagram showing an arrangement of the 10-key keypad of FIG. 12.
FIG. 14 is a diagram showing the ninth embodiment of the present invention.
FIG. 15 is a diagram showing the tenth embodiment of the present invention.
FIG. 16 is a diagram showing the eleventh embodiment of the present invention.
Figure 18:
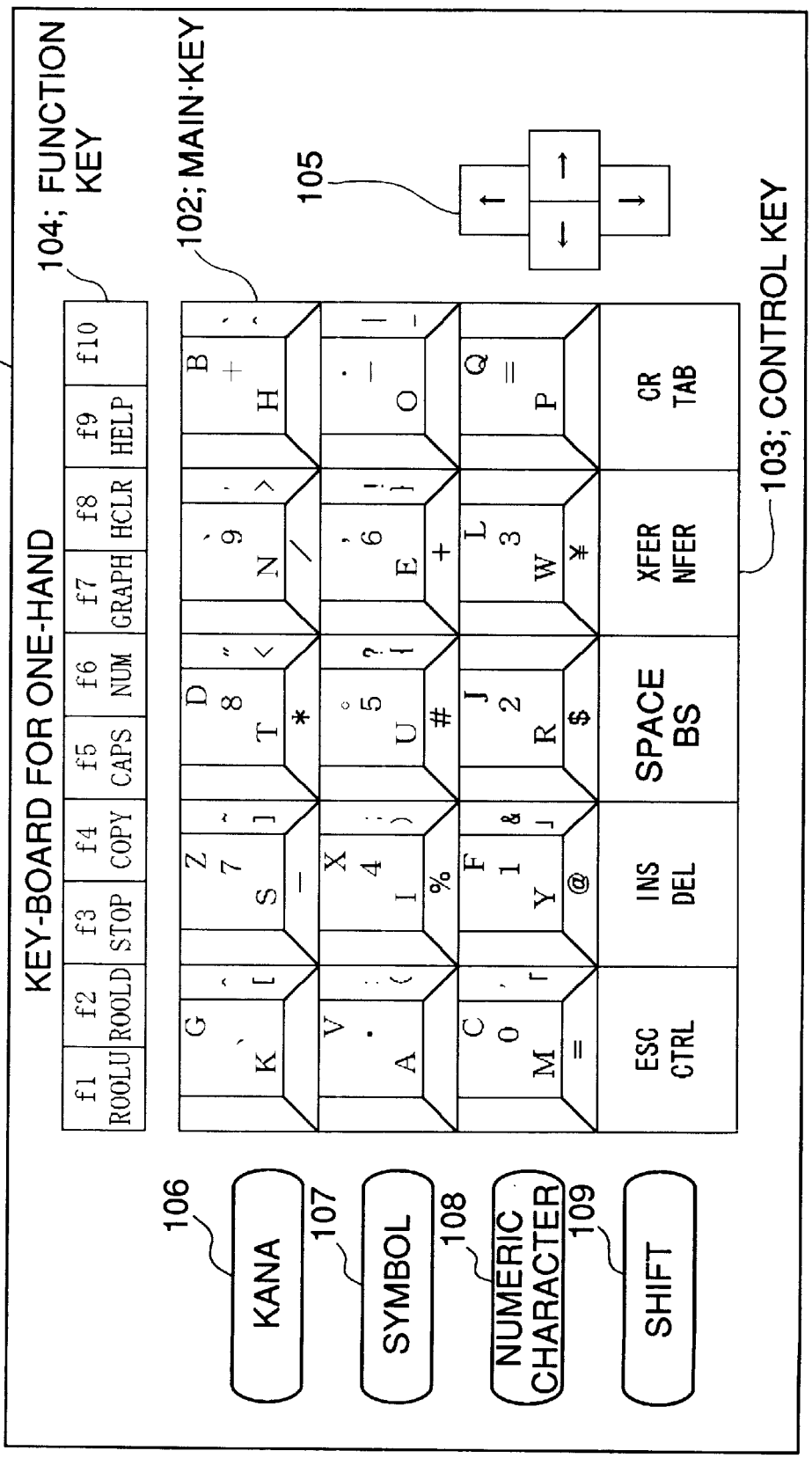
FIG. 18 is a diagram showing a conventional keyboard system.

The concept of a separator key will be described hereinafter referring to FIGS. 2 and 3.

FIG. 2 is a block diagram showing a process for inputting process of character information by a keyboard. FIG. 3 is a diagram for explaining a code symbol and a separator symbol.

Referring to FIG. 2, there are provided a keyboard 200, a decision rule 201 and a set of letters 202. An operator inputs information by sequentially selecting a key from among a plurality of keys on the keyboard 200 and a sequential strokes of the keys. Information representing a specific alphabetical character 202 is obtained by depressing once or a plurality of times. Information from the keyboard 200 is interpreted by the decision rule 201 and is recognized as the letter 202.

The above decision rule 201 are given in advance. A single key or a plurality of specific keys on the keyboard are defined as separator keys, which are used for inputting marks called separator marks. In contrast, a single key or a plurality of specific keys are defined as code keys, which are used for inputting marks called code marks. A specific character information is formed by zero, one, or a plurality of code marks and one separator mark succeeding to the above code marks. The construction of a character information is shown in FIG. 3. If a series of letters are input continuously, it is possible to decide the location of a punctuation by using the separator mark.

Here, the application of separator keys to the input of the Japanese text will be described hereinafter.

FIG. 4 is a diagram showing letters for inputting fifty phonetic characters. As shown in FIG. 4, the letters include vowels such as A, I, U, E and O; and consonants such as K, S, T, N, H, M, Y, R, W, P, G, Z, D and B.

When kana are input as letters, there are the following important characteristics relating to keyboard input.

(1) A Japanese phonetic character is composed of a vowel or a combination of one vowel and one consonant and there is no character which can be expressed by a single consonant, with the exception mentioned in the later item (3).

(2) Consonants from K to H shown in FIG. 4 are unvoiced letters, which accompany corresponding voiced consonant letters G to B except N. Regarding letters from M to P, P is semi-voiced, and there is no voiced consonants corresponding to semi-voiced consonants. Thereby, Japanese phonetic characters can be expressed by five vowel letters, 5+5+4=14 consonant letters, and one exception for a letter N as shown in Table 1.

(3) The consonant letter N has no corresponding voiced letter, but the Japanese phonetic letter corresponding to "n" sound (shown in the right column of Table 1) can be expressed by NN. In Japanese, there are fifty kana characters, the Y-row and the W-row of the kana in the modern Japanese language have merely three and one characters, respectively, in contrast to the five characters for other rows. The vacant spaces related by these exceptions can be used for spaces for inputting punctuations.

Utilizing the above characteristic (1), Japanese phonetic characters can be input by alphabetical letters, setting the five keys corresponding to "A", "I", "U" "E" and "O" as separator keys.

The first embodiment of the present invention will be described hereinafter referring to FIG. 5, which is a diagram showing the first embodiment of the present invention.

Referring to FIG. 5, the first embodiment of the present invention is constructed by five separator keys composed of the "A", "I", "U", "E", and "O" keys and five code keys composed of the "K", "S", "T", "N", and "H" keys.

One stroke of the code keys is made to correspond to five consonant letters K to H, and a two sequential stroke of the same code keys is made to correspond to five voiced letters such as G to B. For example, two sequential strokes of "K", "S", "T" and "H" correspond to G, Z, D and B, respectively. One exception is that two sequential strokes of "N" correspond to the phonetic letter of the "n" sound. An input by two sequential strokes of two different letters correspond to inputs of semi-voiced letters from "M" to "P". For example, two sequential strokes of "KS", "ST", "IN", "TN", "NH", and "HK" corresponds to M, Y, R, W, and P, respectively. In the two sequential strokes of two different letters, any key can be keyed, if the key at the second stroke differs from the first key.

In a practical input operation, the input operation should be easy in inputting complex syllables accompanying diphthongs. The keyboard of the present invention may be utilized for inputting such complex syllables.

Next, the second embodiment of the present invention will be described hereinafter with reference to FIG. 6. FIG. 6 is a diagram showing the second embodiment of the present invention.

Referring to FIG. 6, the second embodiment of the present invention is provided with five separator keys comprising the "A", "I", "U", "E", and "O" keys, and ten code keys comprising the "K", "S", "T", "N", "H", "M", "Y", "R", "W", and "P" keys. Ten code keys correspond to unvoiced and semi-voiced consonant letters, and two sequential strokes of an identical key among "K" to "H" keys correspond to voiced letters. For example, two strokes of "K", "S", "T", and "H" correspond to G, Z, D, and B, respectively. In addition, two sequential strokes of "NN" correspond to a Japanese phonetic character with a "n".

Next, the application of separator keys to the input of English text will be explained. In contrast to Japanese writing with Japanese phonetic characters, letters used for spelling English words do not follow a regular sequence, and there is no particular rule in the permutation of alphabetical letters. However, by setting separator keys and a small number of code keys, it is possible to reduce the number of keys by distinguishing between the case where only a separator key is hit and the case where a separator key and a code key are sequentially hit.

The third embodiment of the present invention is described in detail, referring to FIG. 7, which is a diagram showing the third embodiment of the present invention.

Referring now to FIG. 7, the third embodiment of the present invention is provided with fifteen separator keys including the "A", "I", "U", "E", "O", "K", "S", "T", "N", "H", "M", "Y", "R", "W", and "P" keys and the code key "C1". In this keyboard system, fifteen alphabetical letters are made to correspond to individual separator keys, and the remaining fifteen letters are made to correspond to sequentially depressing the code key "C1" and a separator key. For example, the letter "A" can be input by a stroke of the key "A", and the letter "F" can be input by two sequential strokes of "C1" and "A". Thereby, thirty letters can be input by using sixteen keys.

The fourth embodiment of the present invention is described hereinafter referring to FIG. 8, which is a diagram showing the fourth embodiment of the present invention.

Referring to FIG. 8, a keyboard according to the fourth embodiment is provided with ten separator keys including "A", "I", "U", "E", "O", "K", "S", "T", "N", and "H"; and two code keys "C1" and "C2". Ten letters are made to correspond to the individual separator keys and the remaining twenty letters and special symbols are input by two sequential strokes of either one of code keys and a separator key. For example, the letter A is input by a stroke of the "A" key, the letter M is input by two sequential strokes of the "C1" and "A" keys, and the alphabetical character F is input by two sequential strokes of the "C2" and "A" keys. Thereby, thirty characters can be input by using twelve keys.

Next, the application of separator keys for unified input of Japanese and English texts will be described.

The same keyboard is used for inputting the Japanese text represented by Japanese phonetic characters and English text on the basis that the same letters are used for inputting text in both languages. The Japanese phonetic characters can be expressed by the same letters as that used for inputting English sentences, so that it is preferable for the input of Japanese phonetic characters by letters to be a subsystem of an English keyboard, which has the same arrangement and the same functional allocation as the keyboard for inputting English text.

The fifth embodiment of the present invention is described hereinafter referring to FIG. 9, which shows the fifth embodiment of the present invention.

Referring to FIG. 9, a keyboard according to the fifth embodiment of the present invention is a unified form of the first and fourth embodiments of the present invention, which comprises ten separator keys such as "A", "I", "U", "E", "O", "K", "S", "T", "N", and "H"; and two code keys such as "C1" and "C2".

In an English input mode, letters are input as follows. Ten separator keys are made to correspond to ten letters. The other letters can be input by using the code keys "C1" and "C2".

When keys representing "A", "I", "U", "E", "O", "K", "S", "T", "N" are hit, while depressing "C1", letters F, J, L, Q, C, M, Y, R, W, and P are input. When keys representing "A", "I", "U", "E","O", "K", "S", "T", "N" are hit, while depressing "C2", characters of X, space, <, >, <. >, V, G, Z, D, NN (corresponding to the "n" sound) and B are input.

In a Japanese input mode, the input of Japanese phonetic characters is facilitated when separator keys "A", "I", "U", "E", "O" are used to determine a location of punctuation in a series of successive characters. Switching from the English mode to the Japanese input mode may be executed easily by providing another key.

The sixth embodiment of the present invention will be described hereinafter with reference to FIG. 10, which illustrates an arrangement of keys in the keyboard according to the sixth embodiment.

Referring to FIG. 10, the sixth embodiment of the present invention is provided with 5 separator keys consisting of "A", "I", "U", "E", and "O", for inputting both kana and letters, 5 separator keys consisting of "a", "i", "u", "e", "o" for inputting ideograms, and 16 keys consisting of "K", . . . , "B", and "X" for inputting letters and a key "MD" for switching the input mode from English to Japanese, a key "CS" for controlling functions, a key "SP" for inputting special symbols, and the key "NM" for inputting numerals.

The English inputting mode and the Japanese inputting mode may be switched by depressing the "MD" key.

In the Japanese input mode, 5 keys consisting of "A", "I", "U", "E", and "O" for inputting Japanese phonetic characters, 5 keys consisting of "a", "i", "u", "e", and "o" for inputting the kanji characters (ideograms), and other keys such as "MD", "CS", "SP", "NM" are provided so as to be used for separator keys, and keys consisting of "K", . . . , "B" and "X" are provided as code keys.

In the English inputting mode, 26 keys including "A", "I", "U", "E", "O", "a", "i", "u", "e", "o", and "K", . . . , "B" are provided as separator keys, and keys consisting of "MD", "CS", "SP", and "NM" are provided for code keys. Inputting the letters C, F, J, L, and Q is done by using the keys "o", "a", "i", "u", and "e".

The "CS", "SP", and "NM" keys are provided for realizing the following functions. That is, the "CS" key is a control key having a function corresponding to a function key (such as the F1 key) of a personal computer, the "SP" key is a key for inputting special symbols such as the symbol "&", and the "NM" key is a key for inputting numerals.

As described hereinbefore, the keyboard system according to this embodiment facilitates the input of a combination of Japanese phonetic characters and letters by lightening the burden of switching between kana and letters.

The application of separator keys to a dial-board is described briefly. Although most push-button telephones, mobile phones, and multi-functional telephones are provided with a function capable of inputting simple data, it is possible to improve the inputting function and operability of those telephones by the use of separator keys.

The seventh embodiment of the present invention will be described in detail with reference to FIG. 1, which is a diagram showing the seventh embodiment of the present invention.

Referring to FIG. 1, a keyboard according to the seventh embodiment of the present invention is provided with keys "1" to "9" corresponding to data keys 21 to 29, a "*" key 30, a "0" key 31, a "#" key 32, a "BS" key 33 which is a control key, a "INS" key 34, a "DEL" key 35, a "SP" key 36, a "←" key 37, a "→" key 38, a "↑" key 39, a "↓" key 40, a "bent arrow" key 41, and a "KB" key 42.

In order to facilitate inputting by one hand, twelve keys from the "1" to "9" keys 21 to 29, the "*" key 30, the "0" key 31, and "#" key 32 are disposed in 4 rows and 3 lines, and ten keys from "BS" key 33 to "KB" key are disposed all together at the right hand side of the keyboard. On the key-tops, numerals from 0to 9, and symbols *, and # are marked on the center, letters K, S, T, N, H, A, I, U, E and 0 are marked on the upper side, letters M, Y, R, W, P, F; J, L, Q and C are marked on the left bottom side, and letters G, Z, D, N, B, X, space, Comma, perid, and V are marked on the right bottom side of the key tops.

In the Japanese kana inputting mode, the "0" key 31, keys from "6" to "9" 26 to 29 are assigned as separator keys, and keys from "1" to "5" 21 to 25 are assigned as code keys. In the English inputting mode, keys from "0" to "5" 21 to 25 are assigned as code keys and the remaining keys are assigned as separator keys. When data keys are hit, after a stroke of the "*" key, characters M, Y, R, W, P, F, J, L, and Q are input. When the data keys are hit, after a stroke of the "#" keys, characters G, Z, D, N, B, X, space, <, >, <. >. are input. When the data keys are hit, after two sequential strokes of the "*" keys, special symbols (such as &) are input (special symbols on each key top are not shown). When the data keys are stroked, after two sequential strokes of the "#" key, numerals are input. The completion of inputting numerals can be signaled by two sequential strokes of the "#" key 32. For example, the number 1 is input by successive strokes of keys like "#", "#", "1", "#", "#", and the number 23 is input by successive strokes of keys "#", "#", "2", "3", "#", "#".

In both Japanese kana input mode and English input mode, the functions of the "*" key 30 and the "#" key 32 are the same, and either input mode may be switched by strokes of keys such as "*", "#" or "#", "*".

The special keys have the following functions. The "BS" key 33 is used for deleting a letter just before a cursor, the "INS" key 34 is for inserting a letter, the "DEL" key 35 is for deleting a letter or a kana, and the "SP" key 36 is for inputting a space. The "←" key 37, the "→" key 38, the "↑" key, and the "↓" key are used for moving the cursor left, right, up, and down, respectively. The "bent arrow" key 41 is used for defining an input letter and the "KB" key is used for switching between inputting characters and the dial inputting function of a telephone.

The actions of the hardware of a telephone to which the seventh embodiment of the present invention is applied will be described hereinafter referring to FIG. 11, which is a diagram explaining the action of the hardware.

In order to simplify the explanation, the number of keys is assumed to be 16. Referring to FIG. 11, hexadecimal digital data is produced by a combination circuit 301 based on signals formed at contact-points S0 to S15 from the contact-point-circuits 300. A timing signal T is a differential signal of all logic OR of contact-point signals. Subsequently, these data are processed by processors (not shown). The combination circuit 301 produces signals ranging from 0 to 3 powers of 2. The timing signal T is a differential signal of logical ORs of all of contact-point signals. The contact-point signals S0 to S15 are made effective by the timing signal T and the effective signals are stored in registers 400 to 403.

Moreover, the application of separator keys to the computer keyboard will be described. Conventionally, a keyboard called "10 keypad" is widely used in order to facilitate inputting numerals into a computer and such a keyboard is usually standard equipment with a computer. The concept of this 10 keyboard can be applied for inputting letters.

Recently, the operability of keyboards has improved due to the use of GUI icons and mouses. However, it is still a problem to input phonetic characters or the alphabetical letters in English for inputting names or various titles. In such cases, it will be effective to input, on one hand, special symbols and alphabetical letters using the 10-keyboard by one hand, and to handle a mouse, to perform conversion of phonetic characters to ideograms and to handle function keys with the other hand. It is possible to switch to use of the QWERTY keyboard for inputting longer alphabetical sentences.

Hereinafter, the eighth embodiment of the present invention will be described in detail, referring to FIGS. 12 and 13. FIG. 12 shows an arrangement of the 10 keypad according to the eighth embodiment of the present invention, and FIG. 13 shows allocation of characters in the 10 keypad.

Referring to FIG. 12, the "HOME CRL" key and a "HELP" key have functions corresponding to the "C1" key and the "C2" key, respectively.

Referring to FIG. 12, characters are allocated to respective keys of the 10-keyboard. In the Japanese input mode, the keys "/", "*", "+", "=", and "−" are used as separator keys corresponding to the above "A", "I", "U", "E", and "O" keys and the other keys are used as code keys. By successive strokes of keys "5","6", "7", "8" and "9" corresponding to the "H", "N", "K", "S" and "T" keys, respectively, letter of B, the phonetic character corresponding to "n" sound, G, Z, D are input. In the English inputting mode, keys "C1" and "C2" are used as code keys for inputting letters, numerals and special symbols. The other keys are used as separator keys.

Since this keyboard system consists of a small number of keys, this system is easy to learn, it is easy to become skilled, and is suitable for beginners.

Here, the application of the separator keys to a word-processor will be described. In inputting characters into a word-processor, it is important to efficiently input a lot of character data. One measure is, for example, to apply an unified character inputting system, which enables inputting many phonetic characters mixed with alphabetical letters.

Hereinafter, the ninth embodiment of the present invention will be described in detail, referring to FIG. 14, which is a diagram for explaining the ninth embodiment of the present invention.

Referring to FIG. 14, the ninth embodiment facilitates touch-typing without shifting the position of the fingers by arranging the keys based on ergonomics. That is, the keys for "E", "U", "I", "A", and "O", corresponding to vowels, which are most frequently used in inputting Japanese phonetic characters, are disposed obliquely, and the keys for "K", "S", "T", "N", and "H" are also disposed obliquely opposite the vowels, so that it is possible to type without shifting fingers.

It is also possible to provide "*" and "#" keys for inputting numerals and special symbols.

It is also possible to provide, similar to conventional systems, a space key, a return key, a shift key, a delete key, an insert key, and a back-space key for exclusive use.

The application of separator keys to a small portable devices will be described hereinafter. It is important for portable apparatuses such as an electronic notepads or various small devices to have a reduced size and to be provided with good operability. Sometimes, reduction of size and the operability of a keyboard are not compatible, because of the structure of human hands. However, reduction of size and operability may be balanced by use of separator keys. In particular, the adoption of separator keys enables the keys to be handled by one hand, and it is possible to free the other hand.

Hereinafter, the tenth embodiment of the present invention will be described in detail with reference to FIG. 15, which is a diagram showing the tenth embodiment of the present invention.

Referring to FIG. 15, the tenth embodiment of the present invention comprises keys for characters, arranged in 3 rows and 5 lines, a "SPACE" key, a "*" key, a "#" key, and a "CR (return)" key. In inputting Japanese characters, "A", "I", "U", "E", and "O" keys are assigned as separator keys, the remaining "K" to "P" keys are assigned as code keys, and a "*" and a "#" keys are used for inputting numerals, special symbols, and the remaining letters. The "SPACE" and the "CR" keys are provided for exclusive uses, so as to provide easy handling. For inputting the Japanese text with a combination of ideograms and kana, it is possible to convert phonetic characters to ideograms by use of those keys, similar to conventional inputting operations.

The application of separator keys to a portable personal computer will be described hereinafter. The QWERTY keyboard has been widely used and is still in use now, even though its has problematic points. This is because the standard keyboard is required to have consistent compatibility. However, as personal computers become smaller and lighter, disadvantages in the size and operability of standard keyboards hinders wider application of personal computers. The present embodiment provide a keyboard with a reduced size and with good operability, by eliminating the disadvantages of conventional systems by adopting separator keys, while maintaining affinity and compatibility with the standard keyboard.

The eleventh embodiment of the present invention is described in detail with reference to FIG. 16, which is a diagram for explaining the eleventh embodiment of the present invention.

Referring FIG. 16, the key-board according to the eleventh embodiment of the present invention comprises keys arranged in 3 lines on both sides of the keyboard and each line is constituted by 5 keys. Here, keys for numerals and symbols are not depicted. This keyboard is provided with a "NM" key for inputting numerals, an "SP" key for inputting symbols, a "CS" key for controlling functions, and a "MD" key for switching between inputs of Japanese phonetic characters and English alphabetical letters.

The five keys located at the upper left row are allocated for vowels in both Japanese phonetic characters and letters. The 5 keys located at the left middle line are allocated for vowels for inputting Japanese ideograms, and for inputting consonant letters. The five keys located at the left lower line are used for inputting letters, numerals, special symbols, control functions and for switching the inputting modes.

The 15 keys on the right side are used commonly when inputting consonants of phonetic characters, ideograms, and letters.

In the Japanese character inputting mode, keys located in the upper left line and middle left lines are assigned as the separator keys, and the other keys are assigned as the code keys. In the English letter inputting mode, the "NM", "SP", "CS", and "MD" keys are assigned as the code keys and the other remaining keys are assigned as separator keys.

In inputting Japanese ideograms and Japanese phonetic characters, it is possible to distinguish between inputting ideograms and Japanese phonetic characters by inputting different vowels using different vowel keys for discrimination.

A keyboard of a personal computers is provided with a number of keys, not only for inputting data but also for controlling functions. These keys are not fully utilized when the user and the purpose of the input is presumed. It is possible to reduce control keys drastically by switching control functions to data keys.

The first advantage of the present invention is that the area of each key is large and the operability is improved. The reason is because the number of data keys is reduced by using data keys for both as letter keys and as numeral keys or using data keys for inputting different letters, such that the area of each key becomes large.

The second advantage of the present invention is that the number of strokes for a key can be reduced and operability is improved. The reason is because it is possible select an input letter by a small number of strokes by stroking a code key, or it is also possible to select an input character by a small number of successive strokes of an identical key or different keys.

The third advantage of the present invention is that the operability of the keyboard in inputting Japanese phonetic characters is improved. This is because keys for inputting Japanese phonetic characters are disposed considering a frequency of appearance. For example, "the average appearance frequency of phonetic characters in inputting Japanese text" is recited in page 17 of a book authored by Masanori Morita, entitled "This is an Appropriate Key-Board for Inputting The Japanese Language" issued on Mar. 25, 1992, by Nihon Keizai Shinbunnsha, as shown in FIG. 17. Thus, the 5 vowels with the highest appearance frequency are assigned as 5 separator keys, which have the functions to input vowels as well as to indicate the location of punctuation. The five letters from "K" to "H" which have the second highest frequencies are assigned to code keys and such consonants are selected by one stroke. The remaining ten consonants which have low appearance frequencies are divided into two groups according to voiced or semi-voiced characters and these consonants are input by two sequential strokes of the same key or by two sequential strokes of two different keys. Therefore, a keyboard is realized, which enables an inputting operation with fewer strokes and an easy inputting operation with a reduced number of keys.

The fourth advantage of the present invention is in that the present keyboard facilitates switching between the Japanese kana input mode and the English letter input mode. This is because a key for switching is assigned on the keyboard or it is possible to provide a new key for switching in the keyboard.

The fifth advantage of the present invention is that any disposition of keys can be selected as necessary. The reason is because code keys, separator keys, mode keys are disposed at any key positions as desired.

What is claimed is:

1. A keyboard for inputting characters comprising:
   a separator key which is marked with a separator mark, which is capable of selecting a letter by one stroke of the separator key, wherein at the time of inputting letters in English, a part of the letters are assigned as said separator marks;
   a code-key marked with a code mark, which is not able to select a letter by one stroke of a code key, while a letter is input by a combination of a code mark followed by a separator mark, or a combination of code marks followed by a separator mark, wherein at the time of inputting letters in English a part or all of the remaining alphabetical letters are assigned as said code marks; and
   wherein said keyboard executes inputting of a character by zero, one, or a plurality of strokes of a code key and sequential stroke of a separator key for selecting a letter.

2. A keyboard for inputting characters comprising:
   a separator key which is marked with a separator mark, which is capable of selecting a letter by one stroke of the separator key;
   a code-key marked with a code mark, which is not able to select a letter by one stroke of a code key, while a letter is input by a combination of a code mark followed by a separator mark or a combination of code marks followed by a separator mark;

wherein, at the time of inputting both Japanese kana by letters, and letters in English, a part of the letters are used for inputting both Japanese kana and letters in English and remaining letters are input by the keys provided for inputting the letters; and p1 wherein said keyboard executes inputting of a character by zero, one, or a plurality of strokes of a code key and sequential stroke of a separator key for selecting a letter.

3. A keyboard according to claim 2, wherein a mode key is provided for switching from an inputting mode for Japanese phonetic characters called the Japanese kana inputting mode to the inputting mode of letters in English called the English inputting mode.

4. An electronic apparatus to which a keyboard according to claim 2 is applied.

5. A keyboard for inputting characters comprising:

a separator key which is marked with a separator mark, which is capable of selecting a letter by one stroke of the separator key;

a code-key marked with a code mark, which is not able to select a letter by one stroke of a code key, while a letter is input by a combination of a code mark followed by a separator mark, or a combination of code marks followed by a separator mark:

wherein, at the time of inputting both Japanese phonetic characters by letters and letters in English, the allocation of the separator marks and part of the code marks are changed for inputting Japanese phonetic characters and for inputting letters in English, and the allocations of the remaining separator marks and code marks are maintained without changing the marks; and wherein said keyboard executes inputting of a character by zero, one, or a plurality of strokes of a code key and sequential stroke of a separator key for selecting a letter.

6. A keyboard according to claim 5, wherein a mode key is provided for switching from an inputting mode for Japanese phonetic characters called the Japanese kana inputting mode to the inputting mode of letters in English called the English inputting mode.

7. An electronic apparatus to which a keyboard according to claim 5 is applied.

8. A keyboard for inputting characters comprising:

a separator key which is marked with a separator mark, which is capable of selecting a letter by one stroke of the separator key, wherein at the time of inputting Japanese phonetic characters using letters, vowel keys such as the "A", "I", "U", "E", and "O" keys are designated as said separator keys;

a code-key marked with a code mark, which is not able to select a letter by one stroke of a code key, while a letter is input by a combination of a code mark followed by a separator mark, or a combination of code marks followed by a separator mark, wherein a first key group of alphabetical letter keys corresponding to the consonants of said Japanese phonetic characters composed of five consonant letters which have the highest appearance frequency among said Japanese phonetic characters are designated as said code keys, and a second group of five characters, excluding said first five characters are input by two sequential strokes of keys corresponding to the first group of code keys, and a third group of phonetic characters are input by two sequential strokes of keys excluding said first key group; and wherein said keyboard executes inputting of a character by zero, one, or a plurality of strokes of a code key and sequential stroke of a separator key for selecting a letter.

9. A keyboard for inputting characters comprising:

a separator key which is marked with a separator mark, which is capable of selecting a letter by one stroke of the separator key, wherein at the time of inputting Japanese phonetic characters using letters, vowel keys such as the "A", "I", "U", "E", and "O" keys are designated as said separator keys;

a code-key marked with a code mark, which is not able to select a letter by one stroke of a code key, while a letter is input by a combination of a code mark followed by a separator mark, or a combination of code marks followed by a separator mark, wherein, among letters corresponding to consonants of said Japanese phonetic characters, ten letters which have the highest appearance frequency are assigned as said code keys, and five consonants excluding said ten characters are input by sequential strokes of the same key which is one of the five code keys among said ten code keys among code keys;

wherein said keyboard executes inputting of a character by zero, one, or a plurality of strokes of a code key and sequential stroke of a separator key for selecting a letter.

10. A keyboard for inputting characters comprising:

a separator key which is marked with a separator mark, which is capable of selecting a letter by one stroke of the separator key; wherein, when inputting Japanese phonetic characters by letters, five keys among ten numeral keys from "0", "1" to "9" are assigned as said separator keys for inputting the five letters of A, I, U, E, and O, corresponding to vowels, and when inputting letters in English said ten numeral keys from "0" to "9" are allocated to keys from "A", "I", "U", "E", "O", "K", "S", "T", "N", to "H" keys which are assigned as said separator keys;

a code-key marked with a code mark, which is not able to select a letter by one stroke of a code key, while a letter is input by a combination of a code mark followed by a separator mark, or a combination of code marks followed by a separator mark, wherein, when inputting Japanese phonetic characters by letters the remaining five numeral keys of said ten numeral keys are assigned as said code keys for inputting the consonants of K, S, T, N, and H which have the second highest appearance frequency excluding vowel syllables, and the remaining consonants are input by sequential strokes of the same code keys or by sequential strokes of different code keys, and when inputting letters in English, the "*" and "#" keys are assigned to be said code keys and the consonants of F, J, L, Q, C, M, Y, R, W, and P are input by sequential strokes of said separator keys following to a hit of said "*" key, and letters X, space, comma, period, V, G, Z, D, N, and B are input by a sequential stroke of said separator keys following to a hit of the "#" key; and wherein said keyboard executes inputting of a character by zero, one, or a plurality of strokes of a code key and sequential stroke of a separator key for selecting a letter.

11. A portable telephone to which the keyboard according to claim 10 is applied.

* * * * *